United States Patent Office 3,275,655
Patented Sept. 27, 1966

1

3,275,655
2,3-EPITHIOPROPYL 1-ETHYNYLCYCLOHEXYL ETHER
Roger F. Monroe, Midland, Mich., assignor to The Dow Chemical Company, Midland, Mich., a corporation of Delaware
No Drawing. Filed Aug. 7, 1963, Ser. No. 300,630
1 Claim. (Cl. 260—327)

The present invention is directed to 2,3-epithiopropyl 1-ethynylcyclohexyl ether of the formula

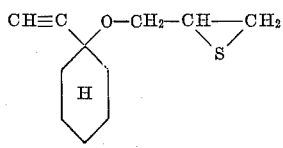

This compound is a water clear, liquid at room temperature, somewhat soluble in many organic solvents and of very low solubility in water. The new compound is useful as a pesticide and is adapted to be employed as the active toxic constituent of compositions for the control of many mite, insect, plant, bacterial and fungal organisms such as helminths, worms, beetles, tapeworms and pigweeds.

The compound of the present invention can be prepared by reacting together thiourea and 1,2-epoxy-3-(1-ethynylcyclohexyloxy)-propane corresponding to the formula

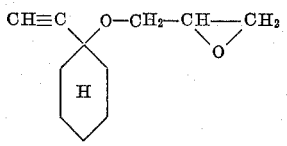

The reaction is carried out in a dilute aqueous solution of a mineral acid. Good results are obtained when essentially equimolar amounts of the thiourea and propane compound are employed. The reaction is somewhat exothermic and takes place at temperatures from 0° to 50° centigrade and preferably between 20° and 50° centigrade with production of the desired product and urea of reaction. The temperature may be controlled by regulating the rate of contacting the reagents or by external cooling. On carrying out the reaction, the reagents are contacted together in any convenient manner. For convenience in maintaining the preferred reaction temperature, it may be advantageous to combine the reagents at a rate such that the heat of reaction can be removed as evolved. The reactants are maintained in contact for a period of time and at a reaction temperature to carry the reaction to completion or as near thereto as desired. The reaction mixture is then neutralized with dilute aqueous alkali metal hydroxide or carbonate. During the neutralization the mixture separates into an aqueous layer and an organic layer. The organic layer is separated by decantation, washed with water and the washed product fractionally distilled under subatmospheric pressure to obtain the desired 2,3-epithiopropyl 1-ethynylcyclohexyl ether.

The following representative operation is not to be construed as limiting.

Example 180 grams (1 mole) of 1,2-epoxy-3-(1-ethynylcyclohexyloxy)-propane was added portionwise with stirring and cooling to a mixture of 76 grams (1 mole) of thiourea, 30 milliliters of concentrated sulfuric acid and 350 milliliters of water. The addition was carried out at a temperature of from 0 to 35° C. and over a period of two hours. The reaction mixture is then diluted with 225 grams of anhydrous sodium carbonate dissolved in 1 liter of water, and the dilute mixture stirred for about ½ hour. During the agitation, the mixture separated into an aqueous layer and an organic layer. The latter layer was separated and fractionally distilled under reduced pressure to obtain the 2,3-epithiopropyl 1-ethynylcyclohexyl ether product. This product was a water white liquid boiling at 76° centigrade at .02 millimeter of pressure, and having a refractive index $n/D$ of 1.5132 at 25° centigrade and a specific gravity of 1.057 at 25° centigrade.

The compound of the present invention is useful as a pesticide for the control of many plant and animal pests. For such use, the unmodified compound can be used. Alternatively, the compound can be dispersed on an inert finely divided solid and the resulting preparation employed as a dust. Also, such preparations can be dispersed in water with or without the aid of a wetting agent and the resulting aqueous dispersions employed as sprays. In other procedures, the compound can be employed in oil or other solvent, or as a constituent of solvent-in-water or water-in-solvent emulsions or as aqueous dispersions thereof which can be applied as a spray, drench or wash. In representative operations, 2,3-epithiopropyl 1-ethynylcyclohexyl ether gives complete kills of nematodes at concentrations of 25 parts by weight of the ether compound per million parts of soil.

I claim:
2,3-epithiopropyl 1-ethynylcyclohexyl ether.

References Cited by the Examiner
UNITED STATES PATENTS 2,986,569   5/1961   Monroe et al. _____ 260—348

OTHER REFERENCES

Lowy et al.: Introduction to Organic Chemistry, John Wiley & Sons, New York (1945), page 213. (Copy in Group 120.)

WALTER A. MODANCE, Primary Examiner.
JAMES A. PATTEN, Assistant Examiner.